(12) United States Patent
Perol et al.

(10) Patent No.: US 6,181,115 B1
(45) Date of Patent: Jan. 30, 2001

(54) DEVICE FOR GENERATING ELECTRICAL ENERGY FOR A POWER SUPPLY BUS

(75) Inventors: Philippe Alfred Perol, Den Haag; Dan Olsson, Voorhout; James Edward Haines, Oegstgeest, all of (NL)

(73) Assignee: Agence Spatiale Europeenne, Paris (FR)

( * ) Notice: Under 35 U.S.C. 154(b), the term of this patent shall be extended for 0 days.

(21) Appl. No.: 09/422,972

(22) Filed: Oct. 22, 1999

(30) Foreign Application Priority Data

Oct. 23, 1998 (FR) .................................................. 98 13294

(51) Int. Cl.[7] .............................. G05F 1/10; G05F 1/40; H02J 3/12
(52) U.S. Cl. ........................ 323/234; 323/909; 320/117; 320/101
(58) Field of Search .................................. 323/906, 234; 320/101, 117, 118; 136/293

(56) References Cited

U.S. PATENT DOCUMENTS

| | | | |
|---|---|---|---|
| 3,816,804 | * | 6/1974 | Cardwell, Jr. ........................ 320/102 |
| 3,896,368 | * | 7/1975 | Rym ..................................... 323/224 |
| 4,327,318 | | 4/1982 | Kwon et al. .......................... 320/101 |
| 4,494,063 | | 1/1985 | Callen et al. ......................... 320/101 |
| 5,327,071 | * | 7/1994 | Frederick et al. .................... 323/299 |
| 5,394,075 | * | 2/1995 | Ahrens et al. ........................ 320/101 |
| 5,602,464 | * | 2/1997 | Linkowsky et al. ................. 323/272 |
| 5,617,002 | | 4/1997 | Sakamoto ............................. 320/102 |
| 5,648,731 | * | 7/1997 | Decker et al. .......................... 324/67 |
| 5,659,465 | * | 8/1997 | Flack et al. ............................. 363/71 |
| 5,814,903 | * | 9/1998 | Wu ....................................... 307/125 |
| 5,874,786 | * | 2/1999 | McVey et al. ......................... 307/18 |
| 5,895,982 | * | 4/1999 | Eng ........................................ 307/87 |
| 5,923,100 | * | 7/1999 | Lukens et al. ......................... 307/66 |
| 6,049,190 | * | 4/2000 | Canter et al. ........................ 323/906 |

* cited by examiner

Primary Examiner—Peter S. Wong
Assistant Examiner—Bao Q. Vu
(74) Attorney, Agent, or Firm—Sughrue, Mion, Zinn, Macpeak & Seas, PLLC

(57) ABSTRACT

A device for generating electrical energy for a power supply bus connected to a load. The device includes an electrical energy storage unit having at least one battery, a solar energy generator presenting a plurality of modules, a regulator for controlling discharging of the storage unit to power the bus, and for each module, a three-state control device. The device also includes a control unit causing the control devices to take up one of their three states. Each three-state control device has a first state in which current from the module powers the bus, a second state in which current from module powers the storage unit, and a third state in which the module is short-circuited.

16 Claims, 2 Drawing Sheets

DEVICE FOR GENERATING ELECTRICAL ENERGY FOR A POWER SUPPLY BUS

The present invention relates to a device for generating electrical energy for a power supply bus, in particular a regulated bus of the kind used on board satellites.

BACKGROUND OF THE INVENTION

Such devices provide the best results for a minimum area of solar sensor and a minimum mass of batteries. Such regulated buses at 50 V or indeed at 100 V are used for geostationary telecommunications satellites and are presently implemented for constellations of satellites such as SKYBRIDGE or indeed CELESTRI/TELEDESIC.

At present, there exist several known architectures for powering a bus from a solar energy generator and from an electrical energy storage unit comprising one or more batteries.

The first concept implements three operating domains, specifically shunt control of excess solar energy generated at a given instant (via a short circuit), charging the energy storage unit, and discharging the energy storage unit. The operating domains are controlled by a control loop which governs the transition between modes and which manages conflicts between operating modes (for example charging and discharging the battery(ies)). That concept requires both a battery charge regulator and a battery discharge regulator to be implemented.

A second concept implements two operating domains, specifically shunt control and discharge of the battery(ies). The charge regulator is not controlled by the control loop, and operation thereof is simplified, however it is no longer possible to manage conflicts.

In a third known concept, referred to as a "hybrid bus", the solar generators are subdivided into two groups, one of which is allocated to powering the bus and the other to charging the batteries. This makes it possible to omit the charge regulator, but operation is not optimized and it turns out to be sensitive to failures in the solar generators.

OBJECTS AND SUMMARY OF THE INVENTION

The present invention relates to an electrical energy generator device for a power supply bus that makes it possible:
  in practice to ensure that operation takes place correctly in all three above-mentioned domains; and
  to avoid implementing a charge regulator of the kind that is to be found in prior art devices.

In other words, the problem posed by the invention is that of conserving operation over three domains while simplifying the architecture of the device.

The idea on which the invention is based is to allocate each of the modules constituting the energy generator either to powering the bus or to charging the battery(ies), or to being short circuited to dump excess energy, depending on requirements, with the modules being individually controllable for this purpose to take up each of the three states.

The invention thus provides a device for generating electrical energy for a power supply bus connected to a load, and comprising:
  a) an electrical energy storage unit comprising at least one battery;
  b) a solar energy generator presenting a plurality of modules;
  c) a regulator for controlling discharging of the storage unit to power said bus from the storage unit, the device including:
  d) for each module, a three-state control device presenting:
    i) a first state in which the current from said module powers the bus;
    ii) a second state in which the current from said module powers the storage unit; and
    iii) a third state in which said module is short circuited; and
  e) a control unit for causing the control devices to take up one of their three states.

In general, each module constitutes a section having a plurality of elementary generators.

In general, the power supply bus presents a capacitive element.

In an advantageous variant, the control unit has a control state for subdividing the control modules in two groups, namely:
  i) a first group in which at least one module is in its first state to power the bus, and in which one of the modules is allocated to regulating the bus voltage, and is for this purpose in its first state only while the maintenance of a nominal voltage on the bus requires current to be delivered from said module; and
  ii) a second group in which at least one module is either in its second state, or else in its third state, as a function of a desired level of charging current, the number of modules in the second state being a function of the desired charging current value.

When maintaining the nominal voltage of the bus does not require current to be supplied from said module, it can be placed in its third state, and preferably it is placed in its second state if the level of said charging current makes that possible, and in its third state otherwise.

A charging control device can generate said value of charging current desired for the electrical energy storage unit. It preferably has an output for an end-of-charging logic signal so as to place at least some of the modules forming a portion of the second group into the third state.

In a preferred embodiment, the modules are connected to the bus via a forwardly-conductive diode, and to the electrical energy storage unit via a controlled switch and a forwardly-conductive diode, closure of the controlled switch placing the module in its second state.

Finally, the invention provides the above-specified device in a system for which the final charging voltage of the storage unit is significantly lower than the nominal voltage of the bus.

BRIEF DESCRIPTION OF THE DRAWINGS

Other characteristics and advantages of the invention will appear better on reading the following description, given by way of non-limiting example and made with reference to the accompanying drawings, in which.

MORE DETAILED DESCRIPTION

Figure 1:
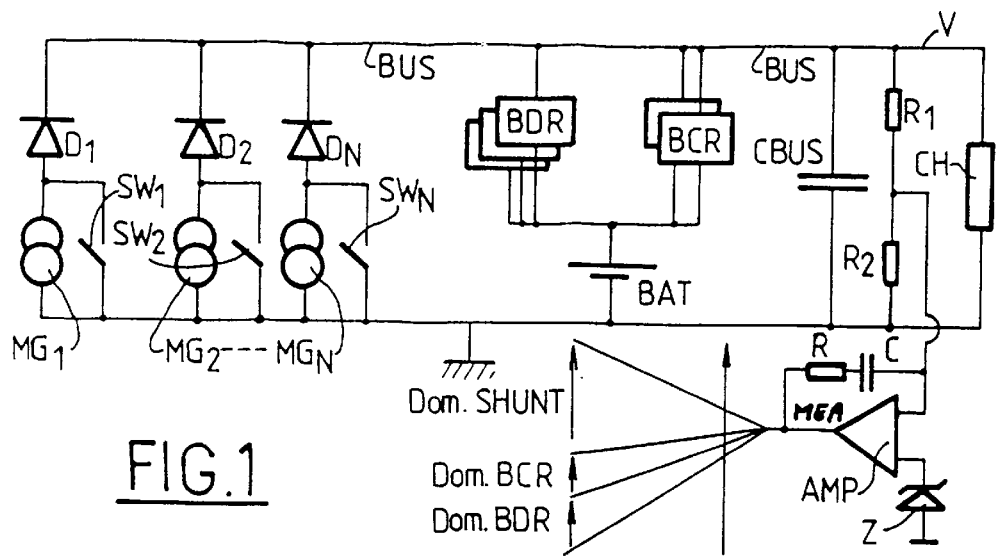
FIG. 1 shows the topology of a prior art device of the three-domain type.

The topology shown in FIG. 1 which corresponds to the known three-domain concept, implements N generator module sections $MG_1$, $MG_2$, etc. $MG_N$, each presenting in parallel a controlled shunt switch $SW_1$, $SW_2$, etc. $SW_N$, and each module is coupled to a power supply bus BUS via a respective forwardly-conductive diode $D_1$, $D_2$, etc. $D_N$. An electrical energy storage unit BAT comprising at least one battery is coupled to the bus BUS via a battery charge regulator BCR in parallel with a battery discharge regulator BDR. The bus BUS includes, in conventional manner, a capacitive element CBUS, and the bus BUS powers a load CH. A mean error signal MEA concerning the voltage V of the bus BUS compared with a reference voltage as given by a zener diode Z is delivered at the outlet of an integrating amplifier AMP. Depending on how high or low the signal MEA happens to be, the system operates either in a shunt domain (higher values) or in a battery charging domain BCR for charging the storage unit BAT, or else for lower values, in a battery discharging domain BDR in which the storage unit BAT is discharged, with this corresponding to the case of operation in eclipse mode when the solar panels are not illuminated. Shunt control of excess power delivered by the solar energy generator, charging of the storage unit BAT, and discharging thereof, are all under the control of a single control loop which provides flexible transitions between modes and which excludes conflicts between operating modes.

The three-domain concept makes good optimization possible of the characteristics of the array of solar cells, as a function of the regulated value V of the bus BUS, and it also makes it possible for the solar cell array to be designed in a manner that is entirely modular, being organized in modules constituted by generally identical sections of elementary solar generators. That design also provides total decoupling of the storage unit BAT by means of the charge regulator BCR and the discharge regulator BDR, thereby making it possible to optimize the batteries.

The second or "two-domain" concept implements the same topology as the "three-domain" concept except that the operation of the charge regulators BCR is not controlled by the general control loop, and regulation of the charging of the storage unit BAT is governed by the main computer. As a result, the main regulation loop cannot exclude simultaneous charging and discharging of the storage unit BAT. The main advantage of that second concept is to simplify the topology of the charge regulator BRC, however such a regulator continues to be necessary.

Figure 2:
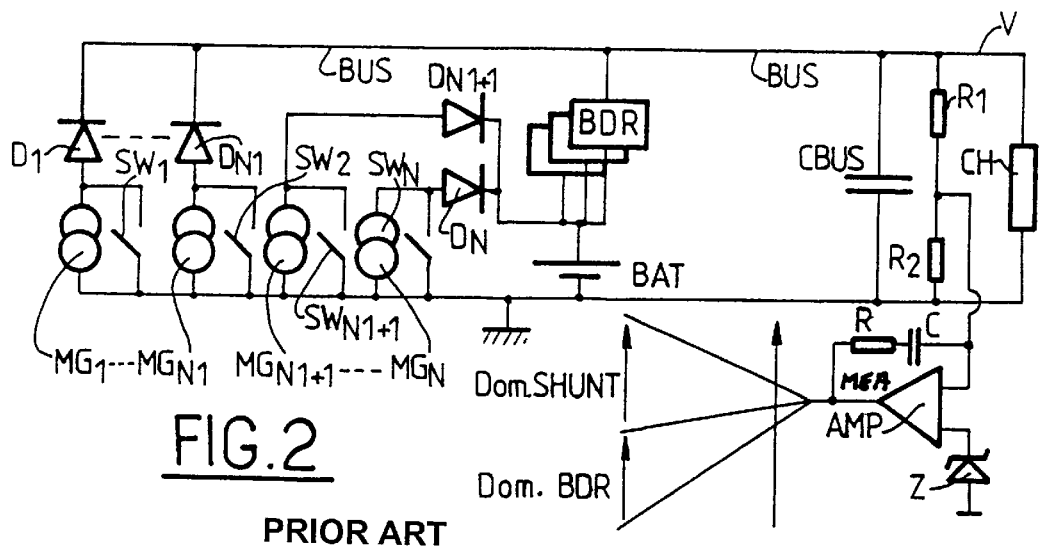
FIG. 2 shows the topology of a "hybrid" type bus that also belongs to the prior art.

The third concept, which is shown in FIG. 2, is the concept known as the "hybrid bus" concept, and it has been used by the Applicant for certain first generation geostationary satellites and for low earth orbit (LEO) missions, in particular in the Eureca system. In that concept, the array of solar cells is subdivided into two portions, the first portion being constituted by modules $MG_1$, etc. $MG_{N1}$ which regulate the voltage of the bus BUS, while the second is constituted by modules $MG_{N1+1}$, etc. $MG_N$ which are allocated to charging the storage unit BAT.

As a result, the charge regulator BCR is omitted. The system operates on the principle of two-domain regulation, concerning regulation of bus voltage (regulation of the solar array, and discharge of the storage unit BAT), while charging of the storage unit BAT is controlled separately, i.e. by the central computer. The end of charging of the storage unit BAT can be managed in two different manners, either by shunting excess solar energy at the end of charging, or else by directing it through the discharge regulator BDR.

The first or three-domain concept makes it possible for operation of the bus power supply system to be more reliable because even when the battery BAT is completely discharged, all of the energy received by the solar array and not required for powering the load is directed on a priority basis to the battery BAT for the purpose of charging it.

Nevertheless, that concept is not the best in terms of heat dissipation and cost, because of the complexity of the converters or regulators BCR, in particular with LEO satellites (i.e. satellites in low earth orbit), and also because of the fact that all of the energy which passes through the battery BAT is subjected to the losses due to the bus BUS, to the charge regulator BCR, and also to the discharge regulator BDR, and that also is penalizing for LEO satellites.

That is why the hybrid bus type concept is generally preferred for LEO satellites, given that they make it possible to omit the regulator BCR, however subdividing the solar array into two non-equivalent portions is not optimal and can make solar array failures critical unless there exists an adequate safety margin. In addition, for LEO satellites, once the battery is charged, the excess solar array power for recharging the batteries can be supplied to the bus only via the regulators BDR together with the losses that result therefrom.

When illuminated by the sun, in the three-domain concept all of the power delivered by the solar array and the peak power output from the regulator BDR is available simultaneously, but in the "hybrid bus" concept, the available peak power is limited to the sum of the peak output power from the regulator BDR plus the power delivered by that portion of the solar array which is connected directly to the bus BUS.

Finally, the modularity of the solar array and the dispositions that need to be taken in the event of failure are easier to implement in the three-domain concept than they are in the "hybrid bus" type concept, or in the two-domain concept.

Figure 3:
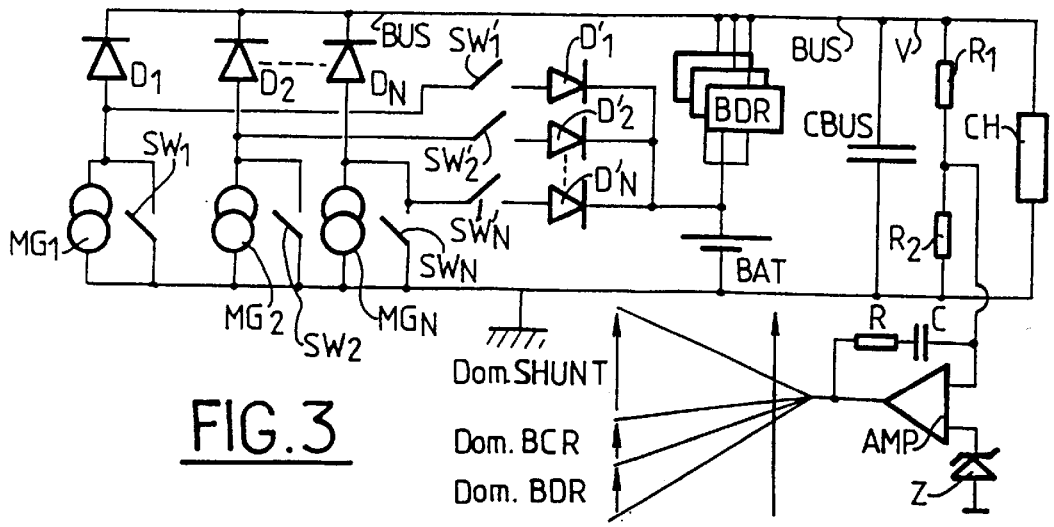
FIG. 3 shows the topology of a device constituting a preferred embodiment of the invention.

The concept of the invention, as shown in FIG. 3, applies particularly well to the case when the voltage for charging the storage unit BAT is, as the end of charging, very slightly lower than the nominal voltage V of the bus BUS. Such a concept is used in particular in the following systems: SPACEBUS 4000, EUROSTAR 3000, OLYMPUS, etc. It serves in particular to enable the regulators BDR to have greater efficiency.

As shown in FIG. 3, each of the generator modules $MG_1$, $MG_2$, etc. $MG_N$ has three operating states. To this end, each of them is coupled to the bus BUS via a respective forwardly-conductive diode $D_1$, $D_2$, etc. $D_N$ and to the storage unit BAT via a respective controllable switch $SW'_1$, $SW'_2$, $SW'_N$ in series with a respective forwardly-conductive diode $D'_1$, $D'_2$, etc. $D'_N$ For a given module MG, when the switches SW and SW' are open, the module MG powers the bus (first state). Closing the switch SW' while keeping the switch SW open enables the module MG to power charging of the storage unit BAT (second state). The third state or "shunt model" is obtained by closing the switch SW while keeping the switch SW' open.

The BCR domain is obtained by sequential switching of the modules or sections of the solar generator to couple them to the unit BAT. Switching the current sources constituted by the solar generator modules provides a power supply in discrete steps for the storage unit BAT, unlike the linear supply of current as obtained by using the prior art regulator BCR. The current charging the batteries BAT is more adjustable when the number of modules MG is larger.

The topography of the invention makes it possible to control the device solely on the basis of two domains relative to the signal MEA, namely: a BDR domain and a "shunt" domain, the control loop providing two ways of dumping excess electrical energy, thereby enabling the "shunt" domain to be subdivided into two modes, i.e. either being directed to the storage unit BAT if it needs to be charged (BCR mode), or else short circuiting when the storage unit BAT is already charged (shunt mode proper). Like any prior art device operating in two or three domains, the current for charging the storage unit BAT is controlled in conventional manner by an independent control loop, either to integrate the number of ampere hours delivered to the unit BAT, or else to control the value of the final charge voltage of the unit BAT as a function of temperature.

Figure 4:
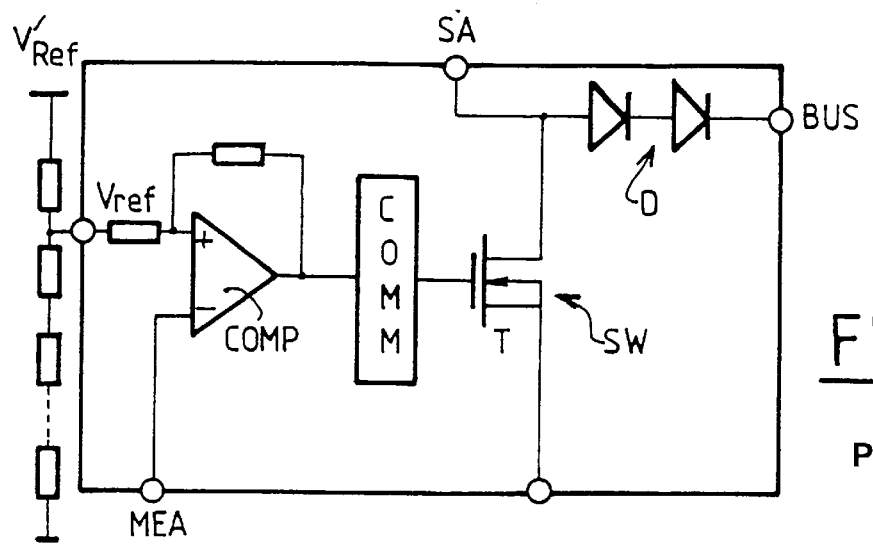
FIGS. 4 to 6 show in comparative manner how a shunt section is controlled in the prior art (FIG. 4) and in an embodiment of the present invention (FIGS. 5 and 6).
Figure 5:
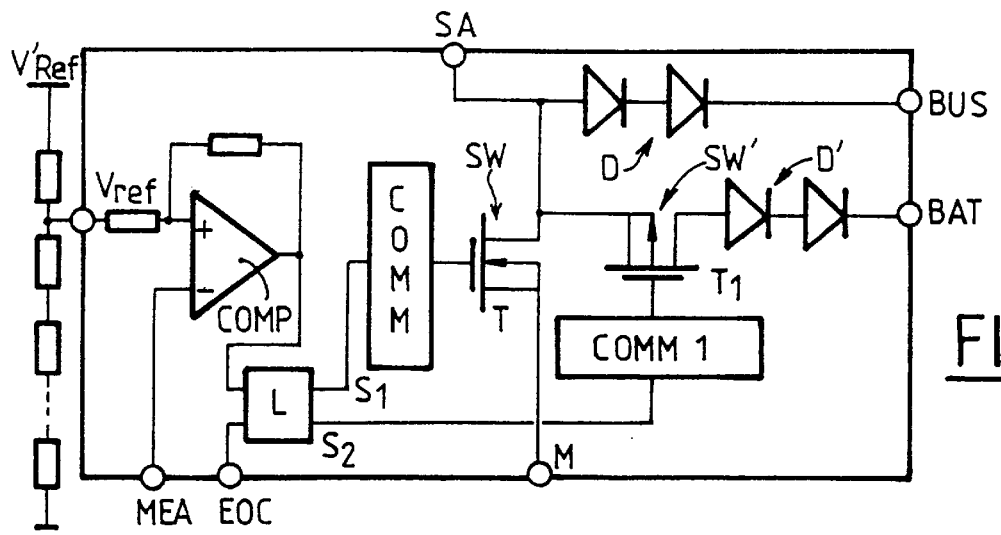
Figure 6:
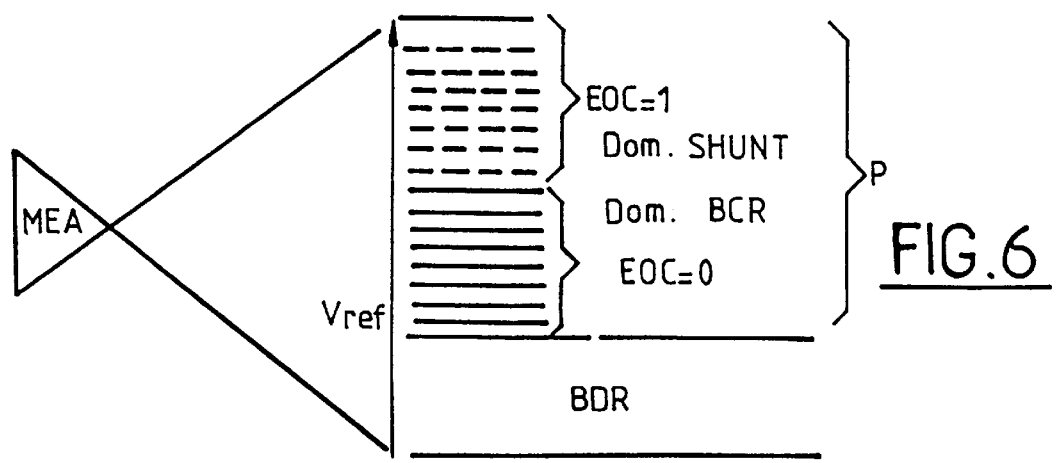

To explain this concept better, reference should be made to FIGS. 4 to 6, in which FIG. 4 shows a conventional shunt section in which the value of the signal MEA is compared with a reference value $V_{ref}$. The result of this comparison is available at the output of a comparator COMP which is applied to a control device COMM whose output controls a field effect transistor T of the MOS type which constitutes the shunt switch SW in such a manner as to couple the active terminal SA of the module MG either to the bus BUS via one or more diodes D, or else to the common mode pole or ground M.

The diagram of FIG. 5, which corresponds to the present invention reproduces the elements shown in FIG. 4, and adds thereto a logic circuit L whose active input receives the end-of-charge signal EOC and whose clear input receives the output from the comparator COMP. When EOC=0, which corresponds to the battery BAT being charged, the output $S_1$ of the circuit L is at its low level. The output $S_2$ of the circuit L is at its high level and applies a positive command to the control circuit COMM1 which allows the storage unit BAT to be charged via the diodes D', given that the transistor T1 is conductive while the transistor T is non-conductive. The logic circuit L has three logic states as a function of the signal EOC and of the level of the signal MEA as detected by the comparator COMP. For $S_1=0$ and $S_2=0$, T and $T_1$ are open, and the module MG is coupled to the bus BUS. For $S_1=0$ and $S_2=1$, the module MG charges the battery BAT (see above). Finally, for $S_1=1$ and $S_2=0$, T is closed and the module is in shunt mode.

Operation is summarized in FIG. 6, i.e. there exist two operating domains relative to the signal MEA, a domain BDR for smaller values and a second domain which is subdivided into a domain BCR when EOC=0 and a shunt domain when EOC=1. In the domain BCR, the signal EOC can be used to deactivate certain sections from charging the battery and to direct the current therefrom to the bus BUS or to place them in shunt mode.

At the end-of-battery charging, when the value of the signal EOC becomes equal to 1, the sections or modules MG that were in operation to charge the storage unit BAT are placed in the shunt or short circuit position. When the signal MEA is in the zone [MEA<$V_{ref}$] corresponding to BDR mode, the logic circuit L controls the sections MG so as to enable them by default in such a manner that they are coupled to the storage unit BAT. At this moment, the current control unit through the unit BAT is capable of adjusting the number of modules MG required by sending an appropriate EOC signal to the sections which are not to be used for charging the unit BAT. In other words, if together all of the sections or modules MG provide too much charging current for the storage unit BAT, then only a limited number of them will be used for charging purposes.

The concept of the invention makes it possible to maintain all of the advantages of the three-domain domain concept without suffering its drawbacks in the event of a bus voltage which is regulated by a battery whose voltage is slightly lower than the voltage V of the bus. It makes it possible to omit the regulators BCR which are complex to implement, and to avoid pointlessly dissipating energy with the associated lower efficiency that results therefrom during a charge/discharge cycle of the unit BAT.

The fact that operation can be maintained in three domains makes it possible, by combining all of the solar cells of the modules MG with the maximum power of the regulator BDR, to obtain a peak maximum power level when all of the cells are exposed to the sun, which makes it easier to select the peak power and the mean power of the regulators BDR for operation in sunlit mode and in eclipse mode. This can be an essential factor in the context of electrical propulsion.

Because the concept makes it possible to obtain three-domain operation even though the amplifier AMP operates in two domains only (shunt and BDR), it follows that there is a reduction in inter-domain transients, thereby making it possible to diminish the size of the capacitor CBUS.

The concept of the invention can be implemented by using a non-redundant number of shunt sections which operate either in short circuit, or else to power the unit BAT, and the number of solar cell sections must be sufficient for good modularity. In practice, two diodes in series are used for connecting the sections or modules MG to the bus BUS and to the unit BAT in such a manner as to protect the system against a simple failure (a diode being short circuited). A P-channel MOSFET type transistor $T_1$ can be used for switching to the battery, but the circuit which activates the transistor must take account of the minimum voltage of the storage unit BAT. Each solar cell section is provided with its own electronics which receives three signals, namely the signal MEA, the signal EOC which is simultaneously an authorization signal for using or not using a section MG as a battery charger, and the signal $V_{ref}$.

It is recommended to implement additional protection for the electronics of the shunt section. When a switch SW' which diverts current from a module MG to the unit BAT becomes a short circuit, it is possible for excess current to reach an already-charged unit BAT. This can be detected in autonomous manner by the signal EOC which should normally deactivate the switch, in combination with detecting the voltage of the unit BAT upstream from the two diodes D'. Under such circumstances, the corresponding short circuiting switch SW can be activated. As soon as the signal MEA is in BDR mode, the signal EOC can be reset to zero so as to allow the unit BAT to be charged through the faulty switch SW'. This makes it possible to continue using a section MG for the purpose of charging the unit BAT, even though said section has a faulty switch.

What is claimed is:

1. A device for generating electrical energy for a power supply bus connected to a load, and comprising:
   a) an electrical energy storage unit comprising at least one battery;
   b) a solar energy generator presenting a plurality of modules;
   c) a regulator for controlling discharging of the storage unit to power said bus from the storage unit, the device including:
   d) for each module, a three-state control device presenting:

i) a first state in which the current from said module powers the bus;

ii) a second state in which the current from said module powers the storage unit; and iii) a third state in which said module is short circuited; and e) a control unit for causing the control devices to take up one of their three states.

2. A device according to claim 1, wherein each module is a section constituted by a plurality of elementary generators.

3. A device according to claim 1, wherein the power supply bus has a capacitive element.

4. A device according to claim 1, wherein the control unit has a control state for subdividing the modules amongst at least one of two groups, namely:

i) a first group in which at least one module is in its first state to power the bus, and in which one of the modules is allocated to regulating the bus voltage, and is for this purpose in its first state only while the maintenance of a nominal voltage on the bus requires current to be delivered from said module; and ii) a second group in which at least one module is either in its second state, or else in its third state, as a function of a desired level of charging current, the number of modules in the second state being a function of the desired charging current value.

5. A device according to claim 4, wherein said module allocated to said regulation is in its third state when maintaining the nominal voltage of the bus does not require current to be contributed from said module.

6. A device according to claim 4, wherein, when maintaining the nominal voltage of the bus does not require current to be contributed from said module allocated to said regulation, said module is placed in its second state if that is possible given said desired level of charging current, and otherwise it is put in its third state.

7. A device according to claim 4, including a charging current control device which generates said desired value for the charging current of the electrical energy storage unit.

8. A device according to claim 4, wherein the control device has an outlet for an end-of-charge logic signal to place at least one of the modules forming a portion of the second group in its third state.

9. A device according to claim 1, wherein each module is connected to the bus via a first forwardly-conductive diode, and to the electrical energy storage unit via a controlled switch, and a second forwardly-conductive diode, closure of the controlled switch placing the module in its second state.

10. The use of a device according to claim 1, in a system for which the end-of-charge voltage of the storage unit is significantly lower than the nominal voltage of the bus.

11. A method for generating electrical energy for a power supply bus coupled to a load, an electrical energy storage unit, a regulator, and a solar energy generator, wherein the electrical energy storage unit comprises at least one battery, the regulator controls discharging of the storage unit to power said bus from the storage unit, and the solar energy generator presents a plurality of modules and associated with each module is a three-state control device, the method comprising:

a) controlling at least a first one of the three-state control devices to be in a first state in which the current from the module associated with the first one of the three-state control device powers the bus;

b) controlling at least a second one of the three-state control devices to be in a second state in which the current from the module associated with the second one of the three-state control devices powers the storage unit; and c) controlling at least a third one of the three-state control devices to be in a third state in which the module associated with the third one of the three-state control devices is short circuited.

12. The method according to claim 11, wherein the first, second and third ones of the plurality of three-state control devices are individually controlled.

13. The method according to claim 11, wherein the first, second and third ones of the plurality of three-state control devices are the same three-state control device.

14. The method according to claim 11, wherein the first one of the plurality of three-state control devices is controlled to be in the first state when the battery is not fully charged and the bus voltage is greater than a reference voltage.

15. The method according to claim 11, wherein the second one of the plurality of three-state control devices is controlled to be in the second state when the battery is not fully charged and the bus voltage is less than a reference voltage.

16. The method according to claim 11, wherein the third one of the plurality of three-state control devices is controlled to be in the third state when the battery is fully charged.

* * * * *